US009094527B2

(12) United States Patent
Setton et al.

(10) Patent No.: US 9,094,527 B2
(45) Date of Patent: Jul. 28, 2015

(54) SEAMLESSLY TRANSFERRING A COMMUNICATION

(75) Inventors: Eric E. Setton, Palo Alto, CA (US); Uri Raz, Palo Alto, CA (US); Barry Andrews, Los Altos, CA (US); Gregory Dorso, San Jose, CA (US)

(73) Assignee: TangoMe, Inc., Mountain View, CA (US)

( * ) Notice: Subject to any disclaimer, the term of this patent is extended or adjusted under 35 U.S.C. 154(b) by 951 days.

(21) Appl. No.: 12/685,396

(22) Filed: Jan. 11, 2010

(65) Prior Publication Data

US 2011/0173331 A1    Jul. 14, 2011

(51) Int. Cl.
*G06F 15/16* (2006.01)
*H04W 36/00* (2009.01)
*H04M 3/58* (2006.01)
*H04M 3/42* (2006.01)

(52) U.S. Cl.
CPC ............ *H04M 3/58* (2013.01); *H04M 3/42263* (2013.01); *H04M 2201/50* (2013.01); *H04M 2207/20* (2013.01)

(58) Field of Classification Search
USPC .......................................................... 709/227
See application file for complete search history.

(56) References Cited

U.S. PATENT DOCUMENTS

| | | | |
|---|---|---|---|
| 6,286,104 B1 * | 9/2001 | Buhle et al. ........................ 726/4 |
| 6,314,108 B1 | 11/2001 | Ramasubramani et al. | |
| 6,614,774 B1 | 9/2003 | Wang | |
| 6,651,250 B1 * | 11/2003 | Takai ............................... 725/31 |
| 6,690,651 B1 * | 2/2004 | Lamarque et al. ............. 370/252 |
| 7,213,047 B2 | 5/2007 | Yeager et al. | |
| 7,254,608 B2 | 8/2007 | Yeager et al. | |
| 7,386,878 B2 | 6/2008 | Fernando et al. | |
| 7,596,618 B2 | 9/2009 | Basu et al. | |
| 7,689,220 B2 * | 3/2010 | Fukushima et al. .......... 455/436 |
| 7,707,034 B2 | 4/2010 | Sun et al. | |
| 7,788,378 B2 | 8/2010 | Rao et al. | |
| 7,809,943 B2 | 10/2010 | Seidel | |
| 7,882,248 B2 | 2/2011 | Sano et al. | |
| 8,037,202 B2 | 10/2011 | Yeager et al. | |
| 8,108,455 B2 | 1/2012 | Yeager et al. | |
| 8,489,701 B2 | 7/2013 | Manion et al. | |
| 2002/0062375 A1 | 5/2002 | Teodosiu et al. | |
| 2004/0030749 A1 * | 2/2004 | Bowman-Amuah .......... 709/204 |
| 2004/0039810 A1 | 2/2004 | Donescu et al. | |

(Continued)

FOREIGN PATENT DOCUMENTS

| | | |
|---|---|---|
| EP | 1229443 | 8/2002 |
| WO | WO-02/42900 | 5/2002 |

(Continued)

OTHER PUBLICATIONS

Eronen, Pasi "Security in the Jini Networking Technology: A Decentralized Trust Management Approach", *Masters Thesis, Helsinki University of Technology, Department of Computer Science and Engineering*, (Mar. 2001),31-33.

(Continued)

*Primary Examiner* — Angela Nguyen (57) ABSTRACT

Seamlessly transferring a communication. At least one communication is established between a first device and a second device. The at least one communication is transferred from the second device to a third device without interrupting the at least one communication and without disconnecting the at least one communication from the first device.

28 Claims, 6 Drawing Sheets

(56) References Cited

U.S. PATENT DOCUMENTS

| | | |
|---|---|---|
| 2004/0088347 A1 | 5/2004 | Yeager et al. |
| 2004/0088348 A1 | 5/2004 | Yeager et al. |
| 2004/0088369 A1 | 5/2004 | Yeager et al. |
| 2004/0133640 A1 | 7/2004 | Yeager et al. |
| 2004/0181689 A1 | 9/2004 | Kiyoto et al. |
| 2005/0238047 A1 | 10/2005 | Holland et al. |
| 2006/0111112 A1* | 5/2006 | Maveddat ................ 455/439 |
| 2006/0256751 A1 | 11/2006 | Jagadeesan et al. |
| 2007/0028133 A1 | 2/2007 | Izutsu et al. |
| 2007/0047516 A1* | 3/2007 | Kottilingal ................ 370/352 |
| 2007/0074019 A1 | 3/2007 | Seidel |
| 2007/0162605 A1* | 7/2007 | Chalasani et al. .......... 709/227 |
| 2007/0274210 A1* | 11/2007 | Jang ...................... 370/229 |
| 2008/0126549 A1 | 5/2008 | Khanchandani et al. |
| 2008/0183853 A1 | 7/2008 | Manion et al. |
| 2008/0201484 A1 | 8/2008 | Sano et al. |
| 2008/0281971 A1* | 11/2008 | Leppanen et al. .......... 709/228 |
| 2009/0023430 A1 | 1/2009 | Levien et al. |
| 2009/0125637 A1 | 5/2009 | Matuszewski |
| 2009/0172180 A1 | 7/2009 | Chiu et al. |
| 2009/0177792 A1 | 7/2009 | Guo et al. |
| 2009/0180429 A1* | 7/2009 | Stevens et al. ............. 370/329 |
| 2009/0313353 A1 | 12/2009 | Lou |
| 2010/0031335 A1 | 2/2010 | Handler |
| 2010/0146092 A1 | 6/2010 | Hu et al. |
| 2010/0146126 A1 | 6/2010 | Lin et al. |
| 2010/0150252 A1 | 6/2010 | Camp, Jr. et al. |
| 2010/0177699 A1* | 7/2010 | Klefter et al. ............. 370/328 |
| 2010/0246788 A1 | 9/2010 | Menard et al. |
| 2010/0299687 A1 | 11/2010 | Bertino-Clarke |
| 2011/0087783 A1 | 4/2011 | Annapureddy et al. |
| 2011/0087915 A1 | 4/2011 | Zhang et al. |
| 2011/0137991 A1 | 6/2011 | Russell |
| 2011/0282945 A1 | 11/2011 | Thyni et al. |

FOREIGN PATENT DOCUMENTS

| | | |
|---|---|---|
| WO | 03/046747 | 6/2003 |
| WO | 2004/063843 | 7/2004 |
| WO | 2007/118250 | 10/2007 |
| WO | 2009/118383 | 10/2009 |
| WO | 2009132446 | 11/2009 |
| WO | 2010/002302 | 1/2010 |
| WO | 2010002302 | 1/2010 |

OTHER PUBLICATIONS

"Jini Architecture Specification", *Sun Microsystems, Inc. Version 1.2*, (Dec. 2001),12-22.

Turgunbaev, Rashid, "Co-Web: A Peer-to-Peer Based, Partially Decentralized Framework for Collaborative Web-content Publishing", First International Conference on Advances in Future Internet, 2009, 6 pages.

Zhang, Meng, "Optimizing the Throughput of Data-Driven Peer-to-Peer Streaming", IEEE Transactions on Parallel and Distributed Systems, col. 20, No. 1, Jan. 2009, 14 pages.

"PCT/US2010/061854 Extended European Search Report", Nov. 4, 2014, 5 pages.

\* cited by examiner

SEAMLESSLY TRANSFERRING A COMMUNICATION

BACKGROUND

Traditionally, a primary form of communication was a telephone communication using the public switched telephone network (PSTN). Communications technology currently provides several different types of devices used to communicate and a single device may have more than one channel for communicating. For example, a user may have access to several devices including a personal computer system, a handheld mobile device, and a telephone all of which may be used for communicating. Additionally, a device such as a mobile device may have several channels for communications such as a wireless card, a cellular connection, WiMax, etc. These devices, and the channels used by these devices, may communicate with other devices via audio and/or video or other types of communications.

The drawings referred to in this description of embodiments should be understood as not being drawn to scale except if specifically noted.

DESCRIPTION OF EMBODIMENTS

Reference will now be made in detail to embodiments of the present technology, examples of which are illustrated in the accompanying drawings. While the technology will be described in conjunction with various embodiment(s), it will be understood that they are not intended to limit the present technology to these embodiments. On the contrary, the present technology is intended to cover alternatives, modifications and equivalents, which may be included within the spirit and scope of the various embodiments as defined by the appended claims.

Furthermore, in the following description of embodiments, numerous specific details are set forth in order to provide a thorough understanding of the present technology. However, the present technology may be practiced without these specific details. In other instances, well known methods, procedures, components, and circuits have not been described in detail as not to unnecessarily obscure aspects of the present embodiments.

Unless specifically stated otherwise as apparent from the following discussions, it is appreciated that throughout the present description of embodiments, discussions utilizing terms such as "establishing," "transferring," "adjusting," "receiving," "identifying," or the like, refer to the actions and processes of a computer system, or similar electronic computing device. The computer system or similar electronic computing device, such as a telephone or handheld mobile device, manipulates and transforms data represented as physical (electronic) quantities within the computer system's registers and memories into other data similarly represented as physical quantities within the computer system memories or registers or other such information storage, transmission, or display devices. Embodiments of the present technology are also well suited to the use of other computer systems such as, for example, optical and mechanical computers.

Overview of Discussion

Embodiments of the present technology are for seamlessly transferring a communication. A single user may be capable of using several communication devices simultaneously. A communication device may be capable of several types of communications, including but not limited to, real-time audio and/or video communication, a text message, a picture, data or any other form of electronic communication wherein the communication is sent and received via electronic communication devices. A communication device is defined to be an electronic device capable of sending and receiving communications over a connection. A connection may be and Internet connection and may be a wired connection, such as an Ethernet connection, or a wireless connection. Communication devices may include, but are not limited to, telephones, computer systems, netbooks, notebooks, television, hand held devices, mobile devices, smart phones, cellular phones, personal digital assistants, the Kindle® wireless reading device, or any device capable of sending and receiving data over a network. The present technology allows a user to login and be using several devices to communicate and to seamlessly transfer a communication between devices on command. For example, a user can login to both a desktop personal computer and a handheld mobile device. The user can begin a communication on the desktop personal computer and then during the communication the user can seamlessly transfer the communication to the handheld mobile device and then leave the room holding the handheld mobile device while continuing the communication session.

The present technology also allows a user to receive different portions of a communication on different devices. For example, a user can receive the audio portion of a communication at a mobile phone while receiving a video portion of the communication at a television or a computer screen. Either portion may be dropped or added during such a communication. Similarly, a communication that has split different portions of the communication and sent them to different devices may be transferred to a device where both portions of the communication are picked up at one device.

Traditionally, a user did not have many communications alternatives to using a telephone to communicate via the public switched telephone network (PSTN). Currently, a user may have many alternatives. Additionally, a user may have more than one device available for communication. For example, a user may have a telephone, a smart phone with channels such as WiFi, cellular and WiMax and a personal computer system connected to the Internet with the ability to communicate via Voice over Internet Protocol (VoIP). The different devices may have different abilities, capabilities and channels for communication. For example, a personal computer system may have a large display and a wide bandwidth for communication, whereas a smart phone may have a small display and a narrow bandwidth for communication.

Embodiments of the present technology allow a user to begin a communication using one device over one channel and then switch to another channel or another device without interrupting or dropping the communication. In one embodiment, the present technology allows a user to add or drop different portions of a multi-media communication. A user may begin a communication using audio only and then add video to the communication and then later drop the video. In one embodiment, the communication is a one-to-one communication meaning one device communicates with only one other device. In one embodiment, the communication may be a multi party communication where multiple devices are able to simultaneously communicate with each other while allowing a user to transfer the communication from a first device to a second device.

Embodiments of the present technology also allow a user to transfer a communication from one channel of a device to another channel of the same device. For example, a user may perform a voice communication using a personal computer via a PSTN channel. During the voice communication the user or the computer system may transfer the voice communication to a VoIP channel on the computer system. Such a transfer may be performed based on criteria such as the cost of one channel over another or the relative quality of one channel over another. In one embodiment, one channel is used for the audio portion of a communication and another channel is used for the video portion of the same communication. A channel is defined as a means for communication. It should be appreciated that a channel may be, but is not limited to, Ethernet, PSTN, 3G or International Mobile Telecommunications-2000, WiFi, WiMax, etc.

Embodiments of Seamlessly Transferring a Communication

Figure 1:
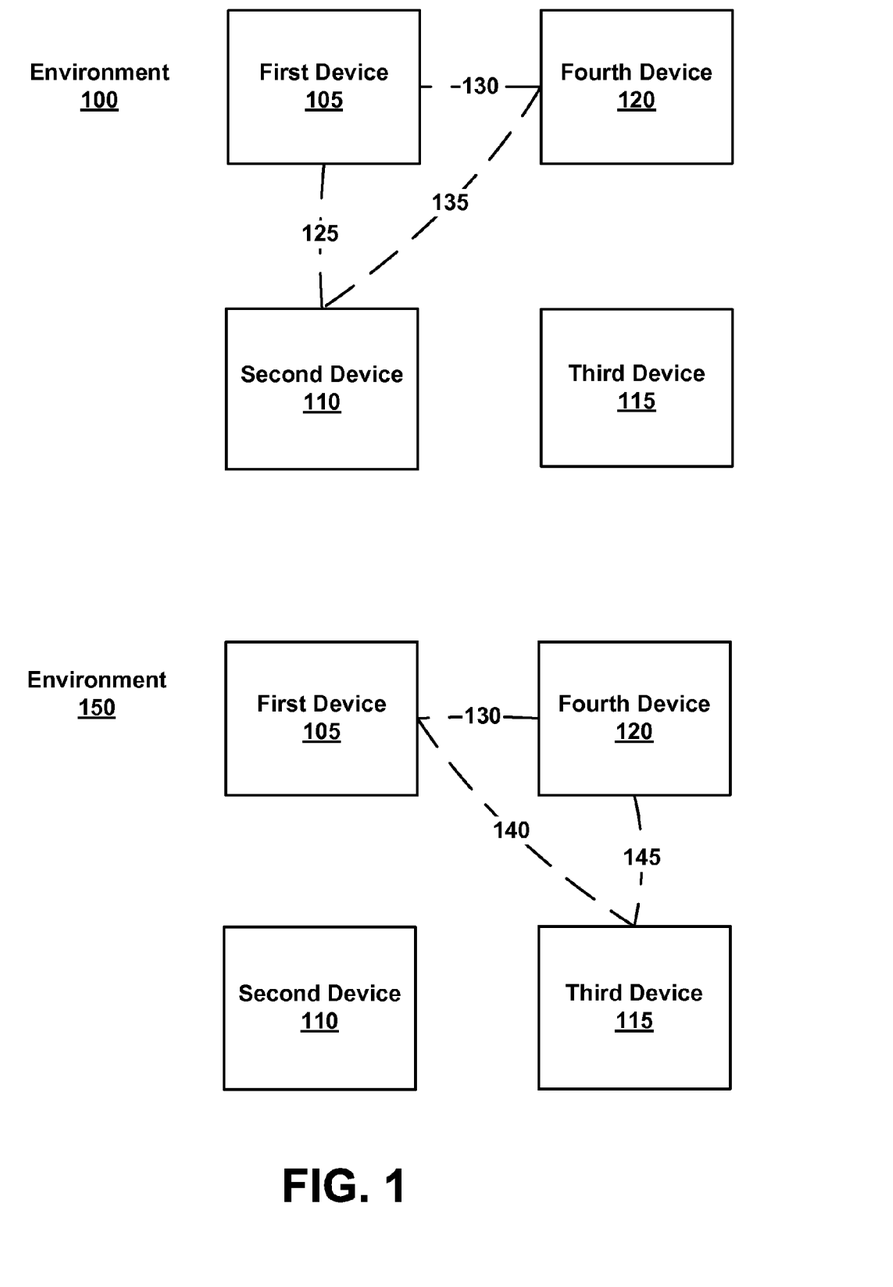
FIG. 1 illustrates a block diagram of example environments of seamlessly transferring a communication in accordance with embodiments of the present technology.

With reference now to FIG. 1, a block diagram of environments for seamlessly transferring a communication. Environments 100 and 150 include first device 105, second device 110, third device 115, fourth device 120, communication lines 125, 130, 135, 140, and 145. Environments 100 and 150 comprise components that may or may not be used with different embodiments of the present technology and should not be construed to limit the present technology.

In one embodiment, environment 100 includes first device 105, second device 110, third device 115, and fourth device 120. In one embodiment, first device 105, second device 110, third device 115, and fourth device 120 are communication devices used to send and receive communications. It should be appreciated that first device 105, second device 110, third device 115, and fourth device 120 may be electronic devices capable of connecting to a network including the Internet and may be capable of sending and receiving various types of communications including, audio, video, text messages, pictures, etc. Environment 100 depicts a multi-party call where first device 105, second device 110, and fourth device 120 are each in simultaneous communication with each other as demonstrated by communication lines 125, 130 and 135. In one embodiment, the communication may only include first device 105 and second device 110 in a one to one communication that would be demonstrated by communication line 125.

In one embodiment, during the communication between first device 105, second device 110, and fourth device 120 it may be desirable for the communication at second device 110 to be transferred to third device 115. In an embodiment where the communication is to be transferred to third device 115, a pick-up message is sent to third device 115. The pick-up operation then proceeds by sending the communication to third device 115 and stopping the communication at second device 110. It should be appreciated that a client application may be installed on each device to enable the functionality of the present technology. It should also be appreciated that a client application may not be installed on a standard telephone operating on the PSTN. In one embodiment, when transferring to or away from a telephone on the PSTN, the pick-up message would be to ring the phone.

Environment 150 depicts a communication that has been transferred to third device 115. In one embodiment, the same user that was receiving and sending the communication at second device 110 in environment 100 is the same user sending and receiving the communication at third device 115 in environment 150. Environment 150 also depicts communication lines 140 and 145 to demonstrate that first device 105 and fourth device 120 are in communication with third device 115. It should be appreciated that in a one to one call between first device 105 and third device 115, environment 150 would not depict fourth device 120 and communication lines 130 and 145.

Figure 1A:
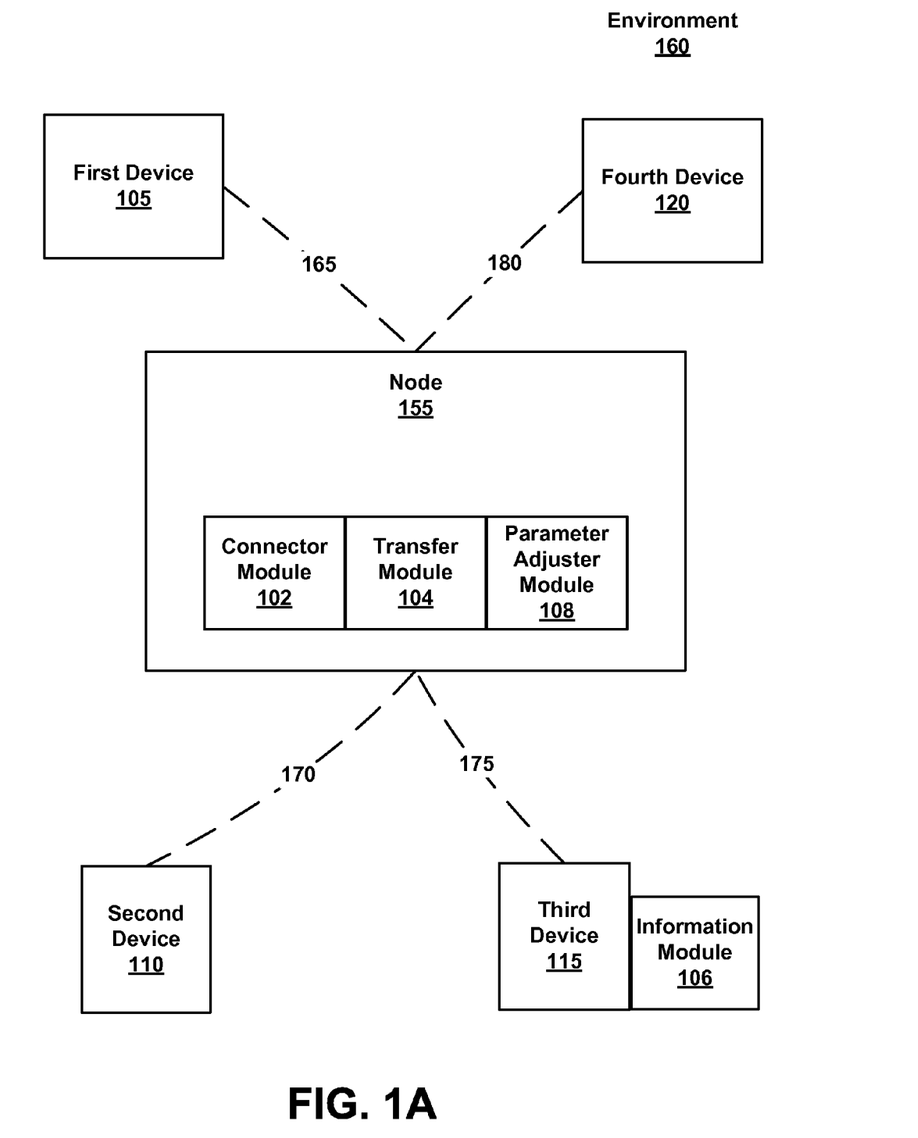
FIG. 1A illustrates a block diagram of an example environment of seamlessly transferring a communication in accordance with embodiments of the present technology.

With reference now to FIG. 1A, a block diagram of environments for seamlessly transferring a communication. Environment 160 depicts first device 105, second device 110, third device 115, fourth device 120, node 155, communication lines 165, 170, 175, and 180, connector module 102, transfer module 104, information module 106 and parameter adjuster module 108. Environment 160 comprises components that may or may not be used with different embodiments of the present technology and should not be construed to limit the present technology.

In one embodiment, node 155 is a computer system that is used as a central point for all communications between first device 105, second device 110, third device 115, and fourth device 120. In one embodiment, node 155 is a server computer system that is in place to manage and relay all communications whether one to one communications or multi party communications. In one embodiment, node 155 represents a plurality of central nodes used to manage communications between any number of devices. It should be appreciated that node 155 is not required for the present technology to operate, but may be present is some embodiments. In one embodiment, node 155 is not present and each device in environment 160 that is participating in communications would comprise components of node 155. In this manner, environment 160 would function similar to a peer-to-peer computer environment.

In one embodiment, node 155 provides each device with information regarding the communication. Such information may include, other devices to which the communication may be transferred, capabilities of the devices, devices currently being used, etc. Capabilities of the devices may comprise the bandwidth limits of the device, the ability to display video or audio, and the ability to capture video or audio. In one embodiment, node 155 is not required to provide this information and instead this information is managed by the devices themselves or other computer systems in a distributed system such as a peer-to-peer computer environment. In such an embodiment, a distributed hash table with the information is maintained by multiple peer computer systems.

In one embodiment, node 155 comprises connector module 102. In one embodiment, connector module 102 is configured to establish communication between at least two devices. It should be appreciated that connector module 102 may be a part of or attached to first device 105, second device 110, third device 115, and/or fourth device 120.

In one embodiment, node 155 comprises transfer module 104. In one embodiment, transfer module 104 is configured to transfer a communication between second device 110 and third device 115. It should be appreciated that transfer module 104 is capable of seamlessly transferring a communication from a device to another device without dropping or interrupting the communication. It should be appreciated that transfer module 104 may be a part of or attached to first device 105, second device 110, third device 115, and/or fourth device 120.

In one embodiment, environment 160 comprises information module 106 attached to or part of third device 115. In one embodiment, information module 106 is configured to communicate information regarding the capabilities of third device 115. For example, information module 106 may communicate to node 155 the bandwidth available to third device 115 for the communications. In one embodiment, environment 155 does not comprise node 155 and information module 106 would communicate directly with another device such as first device 105. It should be appreciated that first device 105, second device 110, third device 115, and fourth device 120 may each comprise an information module similar to information module 106.

In one embodiment, environment 160 comprises parameter adjuster module 108. In one embodiment, parameter adjuster module 108 is configured to adjust a parameter of the communication between at least two devices based on the capabilities of one of the devices. In an embodiment that comprises node 155, node 155 would determine parameters of the communication and adjust the parameters of the communication based on the information received from information module 106. For example, information module 106 may communicate to node 155 that third device 115 has a narrow bandwidth available for the communication. Node 155 would then adjust a parameter of the communication to reduce the amount of bandwidth required for the communication. The adjusted parameter would then be communicated to each of the devices participating in the communication. In an embodiment that does not comprise node 155, each device may comprise a component similar to parameter adjuster module 108. It should be appreciated that the resolution, quality and codecs of the communication may be adjusted.

In one embodiment, a communication is established between first device 105 and second device 110 that comprises both an audio and a video portion and the present technology transfers the communication from second device 110 to third device 115. In this example, third device 115 may not have the ability to display the video portion of the communication. In one embodiment, the video portion of the communication would be dropped from the communication and the audio portion would continue seamlessly without interruption. In one embodiment, the video portion of the communication would be transferred to fourth device 120. In such an embodiment, the video and audio portions of the communication would be sent and received from first device 105 but only the audio portion would be sent and received at third device 115 and only the video portion of the communication would be sent and received at fourth device 120.

Figure 2:
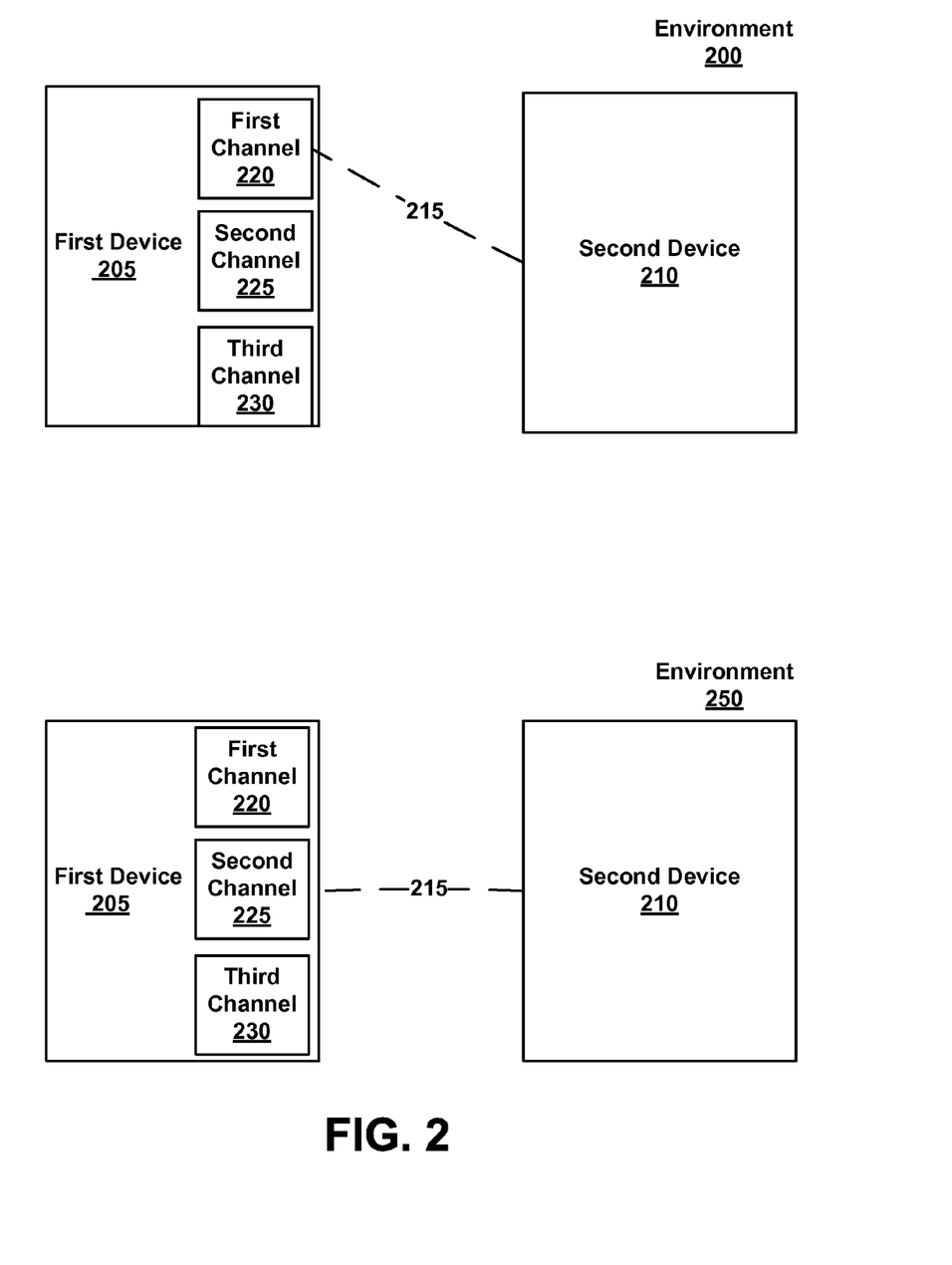
FIG. 2 illustrates a block diagram of example environments of seamlessly transferring a communication in accordance with embodiments of the present technology.

With reference now to FIG. 2, a block diagram of an environment for seamlessly transferring a communication. Environment 200 includes first device 205, second device 210, first channel 220, second channel 225, third channel 230 and communication line 215. Environments 200 and 250 comprise components that may or may not be used with different embodiments of the present technology and should not be construed to limit the present technology.

In one embodiment, first device 205 and second device 210 are communication devices for sending and receiving communications as described above. First channel 220, second channel 225, and third channel 230 depict channels over which first device 205 may send and receive a communication. In one embodiment, channels are multiple types of connectivity for communication. Examples of channels include, but are not limited to, WiFi, 3G, WiMax, Ethernet, VoIP, PSTN, etc. Some channels may require the use of an audio or video codec such as Speex or G.711 to compress the communication for transmission over an Internet protocol connection. It should be appreciated that the communication may include a voice and/or video stream over the same channel. In one embodiment, audio and video streams may be combined for playback on a receiving device or stored in a storage server for later retrieval and playback.

Environment 200 depicts a communication between first device 205 with three communication channels and second device 210 where communication line 215 depicts the communication over first channel 220. The present technology allows an in progress communication to be transferred from one channel to another in the same device. Environment 250 depicts communication line 215 after it has been transferred from first channel 220, as depicted in environment 200, to second channel 225. In one embodiment, the transferring from one channel to second channel is controlled by a user. In one embodiment, the transferring from one channel to second channel is controlled by a service provider. In one embodiment, the transferring from one channel to second channel is controlled by a combination of user and service provider.

Operation

Figure 3:
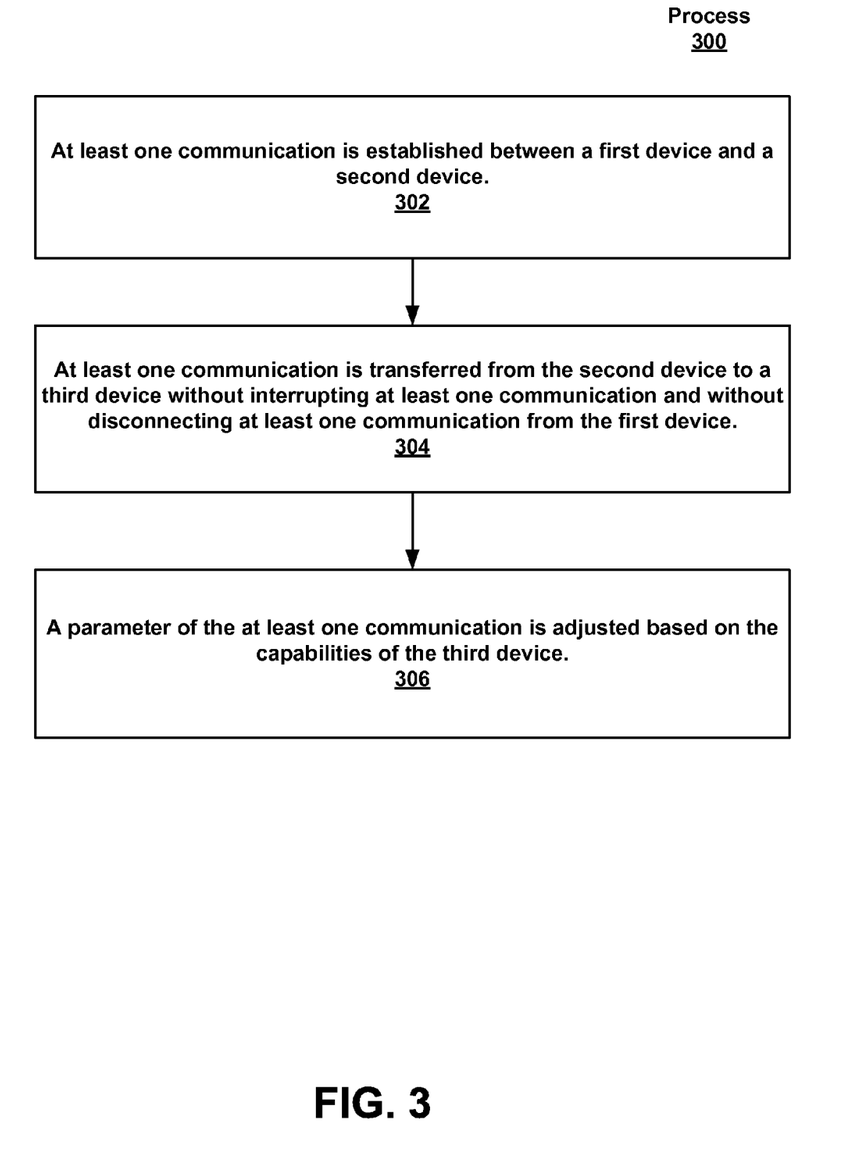
FIG. 3 illustrates a flowchart of an example method for seamlessly transferring a communication in accordance with embodiments of the present technology.

FIG. 3 is a flowchart illustrating process 300 for seamlessly transferring a communication, in accordance with one embodiment of the present invention. In one embodiment, process 300 is a computer implemented method that is carried out by processors and electrical components under the control of computer usable and computer executable instructions. The computer usable and computer executable instructions reside, for example, in data storage features such as computer usable volatile and non-volatile memory. However, the computer usable and computer executable instructions may reside in any type of computer usable storage medium. In one embodiment, process 300 is performed by first device 105, second device 110, third device 115, and/or fourth device 120 of FIG. 1. In one embodiment, the methods may reside in a computer usable storage medium having instructions embodied therein that when executed cause a computer system to perform the method.

At 302, at least one communication is established between a first device and a second device. In one embodiment, the communication may be a voice call where the first device is a telephone on the PSTN network and the second device is a computer system using VoIP. The at least one communication may also be a communication in the form of video, a text message, a picture, electronic data, etc. The first and second device may be electronic devices capable of sending and receiving a communication over a network such as the Internet.

At 304, the at least one communication is transferred from the second device to a third device without interrupting the at least one communication and without disconnecting at least one communication from the first device. In one embodiment, the third device is a handheld mobile device that communicates over a cellular network.

At 306, a parameter of the at least one communication is adjusted based on the capabilities of the third device. For example, the resolution of a video codec may be reduced for a third device that has a lower amount of bandwidth available than the second device.

Figure 4:
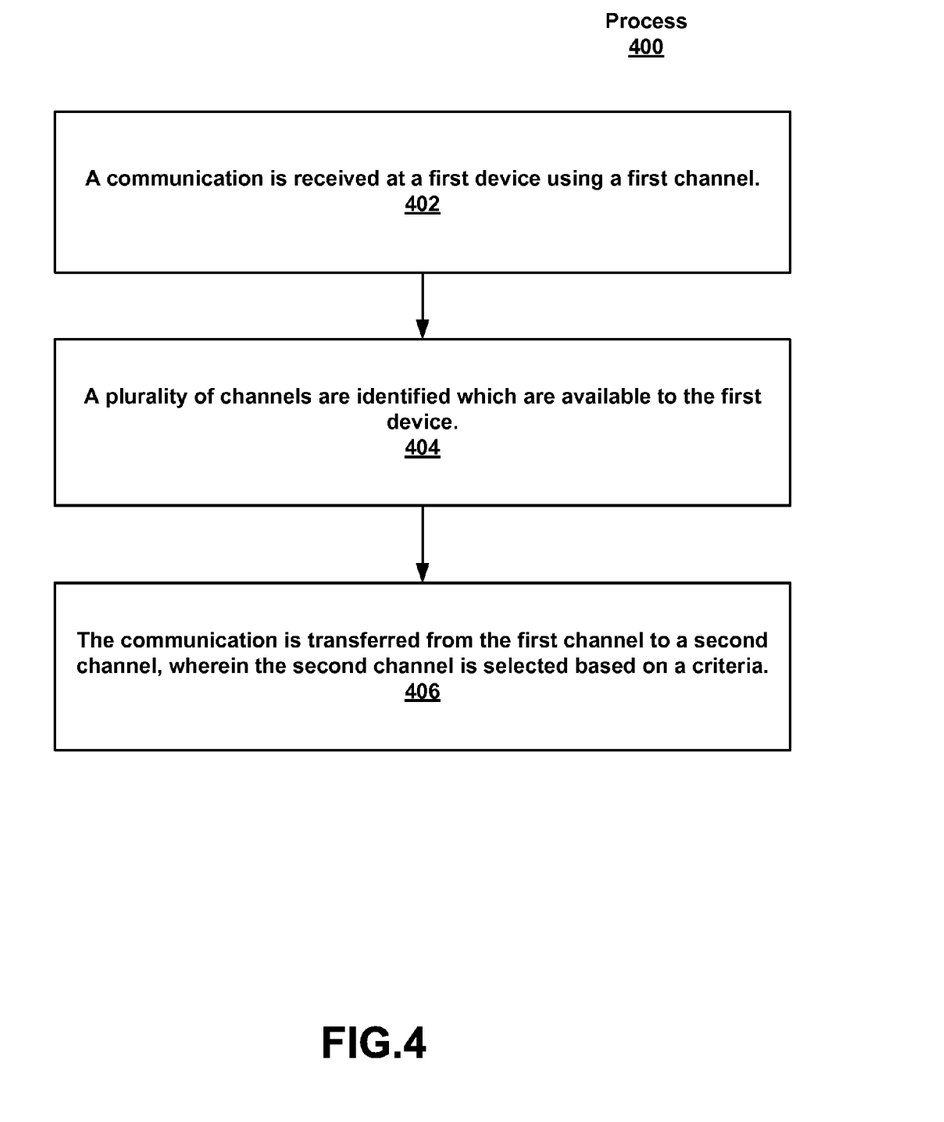
FIG. 4 illustrates a flowchart of an example method for seamlessly transferring a communication in accordance with embodiments of the present technology.

FIG. 4 is a flowchart illustrating process 400 for seamlessly transferring a communication, in accordance with one embodiment of the present invention. In one embodiment, process 400 is a computer implemented method that is carried out by processors and electrical components under the control of computer usable and computer executable instructions. The computer usable and computer executable instructions reside, for example, in data storage features such as computer usable volatile and non-volatile memory. However, the computer usable and computer executable instructions may reside in any type of computer usable storage medium. In one embodiment, process 400 is performed by first device 205 of FIG. 2. In one embodiment, the methods may reside in a computer usable storage medium having instructions embodied therein that when executed cause a computer system to perform the method.

At 402, a communication is received at a first device using a first channel. In one embodiment, the first device is computer system and the communication is an audio communication using VoIP and the first channel is an Ethernet connection to the Internet.

At 404, a plurality of channels are identified which are available to the first device. For example, a computer system may have the ability to connect to a network using Ethernet, Wifi, 3G or PSTN.

At 406, the communication is transferred from the first channel to a second channel, wherein the second channel is selected based on predetermined criteria. In one embodiment, the first channel is an Ethernet connection and the second channel is a 3G connection. In one embodiment, the criteria are based on a quality comparison of said plurality of channels. For example, an algorithm may be used to optimize the quality of the call taking into account pre-defined metrics, measured statistics or a combination of the two. In one embodiment, the criteria are based on a cost of said plurality of channels. For example, an algorithm may be used to minimize the financial cost of the channel selected based on the user's profile to select the optimum channel.

In one embodiment, the media of the communication may be adapted by adjusting the encoding to match the requirements or capabilities of the channel selected.

Example Computer System Environment

Figure 5:
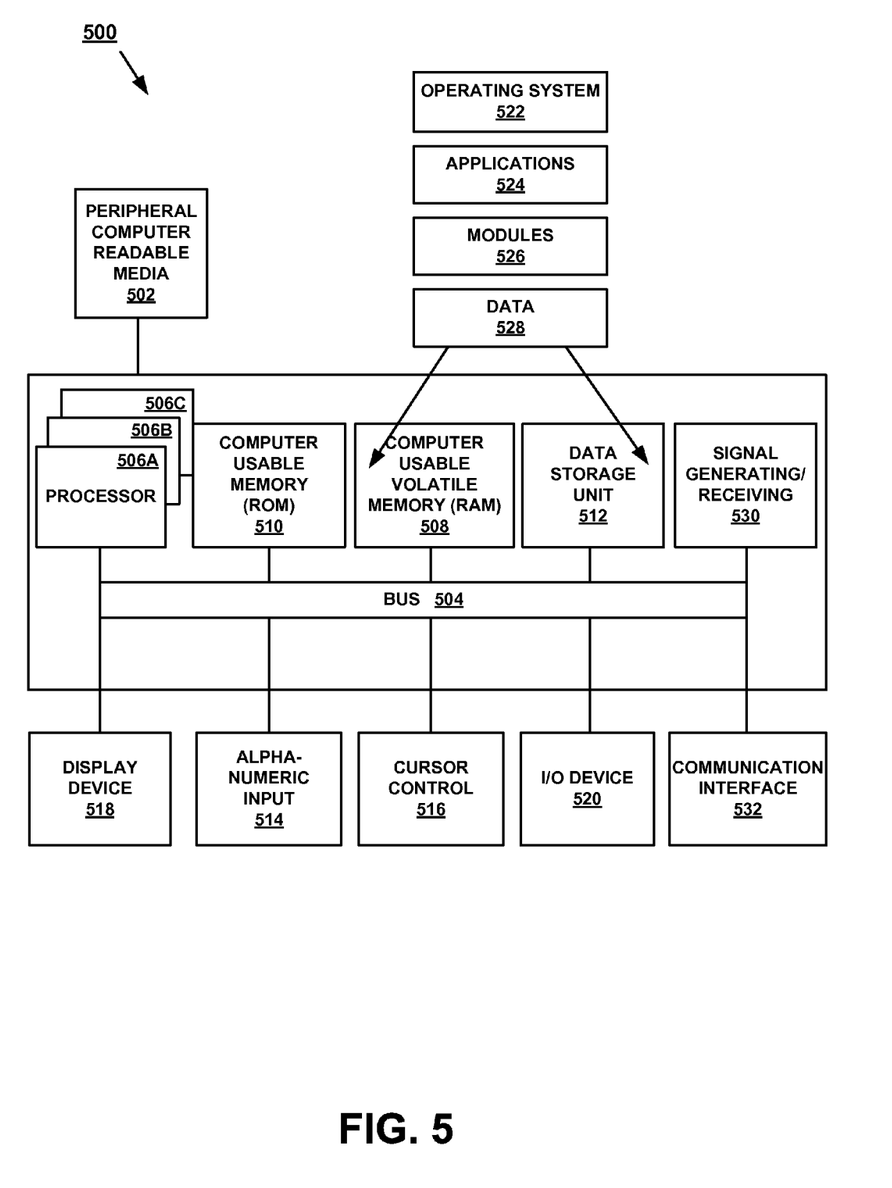
FIG. 5 illustrates a diagram of an example computer system upon which embodiments of the present technology may be implemented.

With reference now to FIG. 5, portions of the technology for providing a communication pathway composed of computer-readable and computer-executable instructions that reside, for example, in computer-usable media of a computer system. That is, FIG. 5 illustrates one example of a type of computer that can be used to implement embodiments of the present technology.

FIG. 5 illustrates an example computer system 500 used in accordance with embodiments of the present technology. It is appreciated that system 500 of FIG. 5 is an example only and that the present technology can operate on or within a number of different computer systems including general purpose networked computer systems, embedded computer systems, routers, switches, server devices, user devices, various intermediate devices/artifacts, stand alone computer systems, mobile phones, personal data assistants, televisions, and the like. As shown in FIG. 5, computer system 500 of FIG. 5 is well adapted to having peripheral computer readable media 502 such as, for example, a floppy disk, a compact disc, and the like coupled thereto.

System 500 of FIG. 5 includes an address/data bus 504 for communicating information, and a processor 506A coupled to bus 504 for processing information and instructions. As depicted in FIG. 5, system 500 is also well suited to a multi-processor environment in which a plurality of processors 506A, 506B, and 506C are present. Conversely, system 500 is also well suited to having a single processor such as, for example, processor 506A. Processors 506A, 506B, and 506C may be any of various types of microprocessors. System 500 also includes data storage features such as a computer usable volatile memory 508, e.g. random access memory (RAM), coupled to bus 504 for storing information and instructions for processors 506A, 506B, and 506C.

System 500 also includes computer usable non-volatile memory 510, e.g. read only memory (ROM), coupled to bus 504 for storing static information and instructions for processors 406A, 406B, and 406C. Also present in system 500 is a data storage unit 512 (e.g., a magnetic or optical disk and disk drive) coupled to bus 504 for storing information and instructions. System 500 also includes an optional alpha-numeric input device 514 including alphanumeric and function keys coupled to bus 504 for communicating information and command selections to processor 506A or processors 506A, 506B, and 506C. System 500 also includes an optional cursor control device 516 coupled to bus 504 for communicating user input information and command selections to processor 506A or processors 506A, 506B, and 506C. System 500 of the present embodiment also includes an optional display device 518 coupled to bus 504 for displaying information.

Referring still to FIG. 5, optional display device 518 of FIG. 5 may be a liquid crystal device, cathode ray tube, plasma display device or other display device suitable for creating graphic images and alpha-numeric characters recognizable to a user. Optional cursor control device 516 allows the computer user to dynamically signal the movement of a visible symbol (cursor) on a display screen of display device 518. Many implementations of cursor control device 516 are known in the art including a trackball, mouse, touch pad, joystick or special keys on alpha-numeric input device 514 capable of signaling movement of a given direction or manner of displacement. Alternatively, it will be appreciated that a cursor can be directed and/or activated via input from alpha-numeric input device 514 using special keys and key sequence commands.

System 500 is also well suited to having a cursor directed by other means such as, for example, voice commands. System 500 also includes an I/O device 520 for coupling system 500 with external entities. For example, in one embodiment, I/O device 520 is a modem for enabling wired or wireless communications between system 500 and an external network such as, but not limited to, the Internet. A more detailed discussion of the present technology is found below.

Referring still to FIG. 5, various other components are depicted for system 500. Specifically, when present, an operating system 522, applications 524, modules 526, and data 528 are shown as typically residing in one or some combination of computer usable volatile memory 508, e.g. random access memory (RAM), and data storage unit 512. However, it is appreciated that in some embodiments, operating system 522 may be stored in other locations such as on a network or on a flash drive; and that further, operating system 522 may be accessed from a remote location via, for example, a coupling to the Internet. In one embodiment, the present technology, for example, is stored as an application 524 or module 526 in memory locations within RAM 508 and memory areas within data storage unit 512. The present technology may be applied to one or more elements of described system 500.

System 500 also includes one or more signal generating and receiving device(s) 530 coupled with bus 504 for enabling system 500 to interface with other electronic devices and computer systems. Signal generating and receiving device(s) 530 of the present embodiment may include wired serial adaptors, modems, and network adaptors, wireless modems, and wireless network adaptors, and other such communication technology. The signal generating and receiving device(s) 530 may work in conjunction with one or more communication interface(s) 532 for coupling information to and/or from system 500. Communication interface 532 may include a serial port, parallel port, Universal Serial Bus (USB), Ethernet port, antenna, or other input/output interface. Communication interface 532 may physically, electrically, optically, or wirelessly (e.g. via radio frequency) couple system 500 with another device, such as a cellular telephone, radio, or computer system.

The computing system 500 is only one example of a suitable computing environment and is not intended to suggest any limitation as to the scope of use or functionality of the present technology. Neither should the computing environment 500 be interpreted as having any dependency or requirement relating to any one or combination of components illustrated in the example computing system 500.

Embodiments of the present technology may be described in the general context of computer-executable instructions, such as program modules, being executed by a computer. Generally, program modules include routines, programs, objects, components, data structures, etc., that perform particular tasks or implement particular abstract data types. Embodiments of the present technology may also be practiced in distributed computing environments where tasks are performed by remote processing devices that are linked through a communications network. In a distributed computing environment, program modules may be located in both local and remote computer-storage media including memory-storage devices.

Although the subject matter is described in a language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A computer implemented method for seamlessly transferring a communication, said method comprising:
    establishing at least one communication between a first device and a second device, wherein a user login is associated with a user at a client application at said second device; and
    transferring said at least one communication from said second device to a third device without interrupting said at least one communication and without disconnecting said at least one communication from said first device, wherein said user login is associated with said user at a second client application at said third device, wherein said transferring sends a first portion of said at least one communication over a first channel to said third device and a second portion of said at least one communication over a second channel to said third device, wherein said transferring occurs without requiring a central node and wherein each of said first device and said second device comprises a parameter adjustment module.

2. The computer implemented method as recited in claim 1 wherein said third device communicates information regarding capabilities of said third device.

3. The computer implemented method as recited in claim 1 wherein said at least one communication is an audio communication.

4. The computer implemented method as recited in claim 1 wherein said at least one communication is a video communication.

5. The computer implemented method as recited in claim 1 wherein said first device is a device selected from the group of devices consisting of: a computer system, a mobile device, and a telephone.

6. The computer implemented method as recited in claim 1 wherein said establishing said at least one communication further comprises establishing a communication between said first device, said second device and a fourth device.

7. The computer implemented method as recited in claim 1 wherein said establishing said at least one communication further comprises a plurality of communications.

8. The computer implemented method as recited in claim 1 wherein said transferring said at least one communication further comprises transferring an audio portion of said at least one communication to a third device and transferring a video portion of said communication to a fourth device.

9. The computer implemented method as recited in claim 2, further comprising:
    adjusting a parameter of said at least one communication based on said capabilities of said third device.

10. The computer implemented method as recited in claim 9 wherein said adjusting said parameter is adjusting a number of layers of said at least one communication wherein a scalable codec is used for said at least one communication.

11. The computer implemented method as recited in claim 9 wherein said adjusting said parameter is adjusting an encoding rate of said at least one communication.

12. The computer implemented method as recited in claim 9 wherein said adjusting said parameter is adjusting an output resolution of said at least one communication.

13. The computer implemented method as recited in claim 9 wherein said adjusting said parameter is changing the codec used for said at least one communication.

14. A computer usable storage memory having instructions embodied therein for causing a computer system to perform the steps of seamlessly transferring a communication:
    establishing at least one communication between a first device and a second device, wherein a user login is associated with a user at a client application at said second device; and
    transferring said at least one communication from said second device to a third device without interrupting said at least one communication and without disconnecting said at least one communication from said first device, wherein said user login is associated with said user at a second client application at said third device, wherein said transferring said at least one communication further comprises transferring an audio portion of said at least one communication to a third device and transferring a video portion of said communication to a fourth device, wherein said transferring occurs without requiring a central node and wherein each of said first device and said second device comprises a parameter adjustment module.

15. The computer usable storage memory of claim 14 wherein said third device communicates information regarding capabilities of said third device.

16. The computer usable storage memory of claim 14 wherein said at least one communication is an audio communication.

17. The computer usable storage memory of claim 14 wherein said at least one communication is a video communication.

18. The computer usable storage memory of claim 14 wherein said first device is a device selected from the group of devices consisting of: a computer system, a mobile device, and a telephone.

19. The computer usable storage memory of claim 14 wherein said establishing said at least one communication further comprises establishing a communication between said first device, said second device and a fourth device.

20. The computer usable storage memory of claim 14 wherein said establishing said at least one communication further comprises a plurality of communications.

21. The computer usable storage memory of claim 15, further comprising:
adjusting a parameter of said at least one communication based on said capabilities of said third device.

22. The computer usable storage memory of claim 15 wherein said adjusting said parameter is adjusting a number of layers of said at least one communication wherein a scalable codec is used for said at least one communication.

23. The computer usable storage memory of claim 15 wherein said adjusting said parameter is adjusting an encoding rate of said at least one communication.

24. The computer usable storage memory of claim 15 wherein said adjusting said parameter is adjusting an output resolution of said at least one communication.

25. The computer usable storage memory of claim 15 wherein said adjusting said parameter is changing the codec used for said at least one communication.

26. A system for seamlessly transferring a communication, said method comprising:
a connector module, associated with a first device, configured to establish at least one communication between said first device and a second device, wherein a user login is associated with a user at a client application at said second device; and
a transfer module, associated with said first device, configured to transfer said at least one communication from said second device to a third device without interrupting said at least one communication and without disconnecting said at least one communication from said first device, wherein said user login is associated with said user at a second client application at said third device, wherein said transferring said at least one communication further comprises transferring an audio portion of said at least one communication to a third device and transferring a video portion of said communication to a fourth device, wherein said transfer occurs without requiring a central node and wherein each of said first device, said second device, said third device, and said fourth device, comprises a parameter adjustment module.

27. The system as recited in claim 26, further comprising:
an information module configured to communicate information regarding capabilities of said third device.

28. The system as recited in claim 27, further comprising:
a parameter adjuster module configured to adjust a parameter of said at least one communication based on said capabilities of said third device.

* * * * *